(12) United States Patent
Schlangen

(10) Patent No.: US 8,540,264 B1
(45) Date of Patent: Sep. 24, 2013

(54) STEPPER BIKE

(76) Inventor: Phillip E. Schlangen, Minneapolis, MN (US)

(*) Notice: Subject to any disclaimer, the term of this patent is extended or adjusted under 35 U.S.C. 154(b) by 38 days.

(21) Appl. No.: 12/803,352

(22) Filed: Jun. 25, 2010

(51) Int. Cl.
*B62M 1/00* (2010.01)

(52) U.S. Cl.
USPC ............ 280/221; 280/220; 280/253; 280/261

(58) Field of Classification Search
USPC ................. 280/210, 220, 221, 251, 252, 253, 280/254, 255, 256, 257, 258, 259, 260, 261
See application file for complete search history.

(56) References Cited

U.S. PATENT DOCUMENTS

| | | | | |
|---|---|---|---|---|
| 1,799,947 | A * | 4/1931 | Benjamin | 280/221 |
| 2,567,453 | A * | 9/1951 | Swenson et al. | 446/286 |
| 2,707,112 | A | 4/1955 | Ludwigson et al. | |
| 4,093,260 | A * | 6/1978 | Terzian et al. | 280/240 |
| 4,186,934 | A * | 2/1980 | Collings | 280/221 |
| 4,361,338 | A * | 11/1982 | Kuchenbecker et al. | 280/828 |
| 4,411,442 | A | 10/1983 | Rills | |
| 5,368,321 | A | 11/1994 | Berman et al. | |
| 6,588,785 | B2 * | 7/2003 | Monary | 280/238 |
| 6,716,141 | B2 | 4/2004 | Bhoopathy | |
| 7,192,038 | B2 * | 3/2007 | Tsai | 280/87.041 |
| 7,300,065 | B2 | 11/2007 | Tal | |
| 7,377,532 | B2 | 5/2008 | Bauce | |
| D581,991 | S | 12/2008 | Armand et al. | |
| 8,272,655 | B2 * | 9/2012 | Kim | 280/221 |
| 2010/0225085 | A1 * | 9/2010 | Kim | 280/221 |
| 2010/0320716 | A1 * | 12/2010 | Sung | 280/210 |

* cited by examiner

*Primary Examiner* — Kevin Hurley
*Assistant Examiner* — Marc A Scharich
(74) *Attorney, Agent, or Firm* — Richard O. Bartz

(57) ABSTRACT

A four wheel stepper bike having a body with an internal chamber containing a drive mechanism for transmitting power to a wheel, a steering linkage, and a brake. Foot pedal units on opposite side of the body are moved by an operator's feet to apply force to the drive mechanism. A steering column with handles hinged to the body and connected to the steering linkage is selectively movable to steer the bike and move between upright and folded positions. Bumpers attached to an end of the body support the bike in an upright position on a support surface when the steering column is in the folded position.

20 Claims, 18 Drawing Sheets

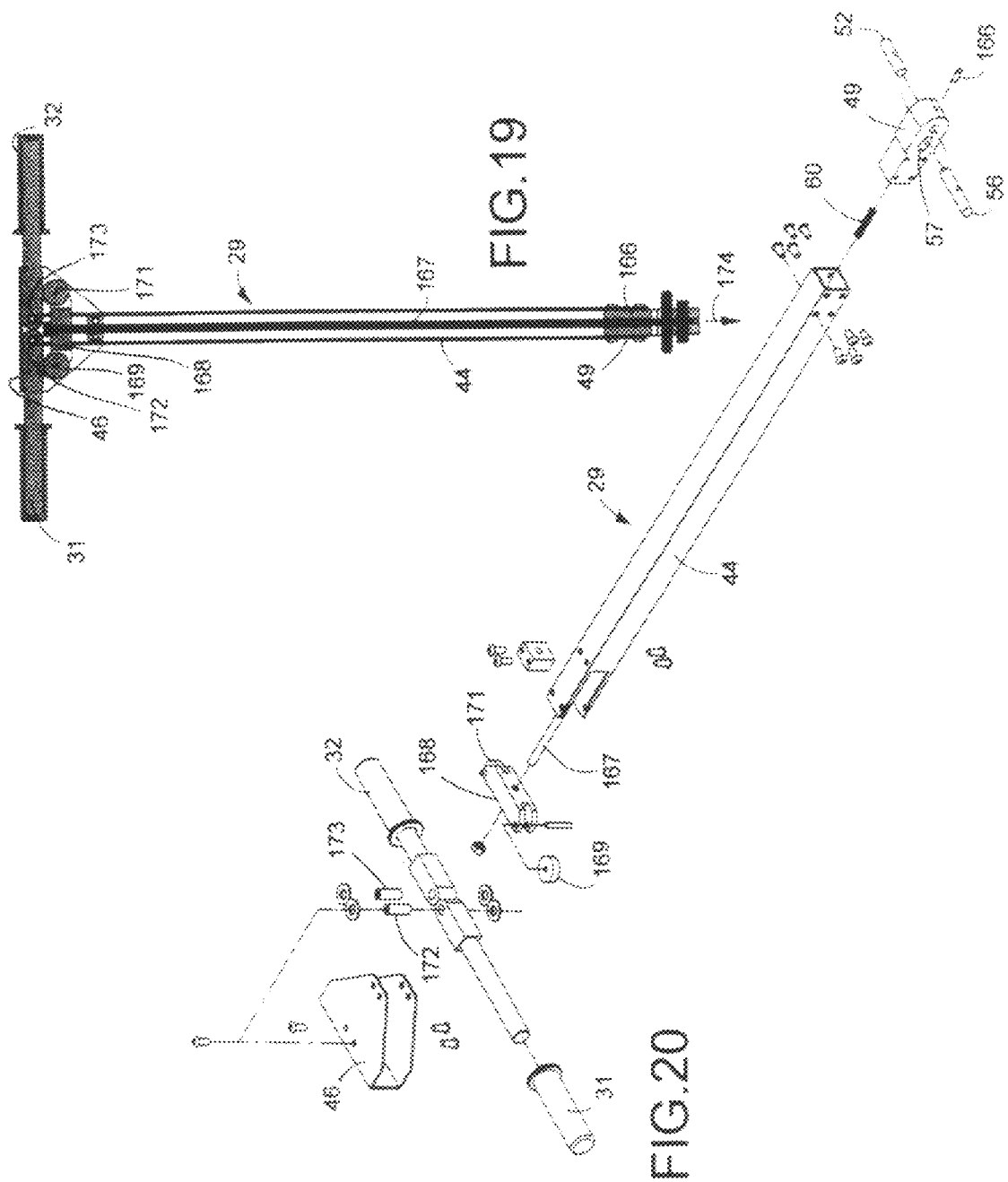

STEPPER BIKE

CROSS RELATED APPLICATION

None.

FIELD OF THE INVENTION

This invention relates to manual foot pedal wheeled vehicles commonly known as stepper bikes. More particularly, the invention has reference to a stepper bike having four wheels and foot pedal units which are actuated by either foot of the operator in an independent fashion with both feet being capable of applying a driving force to a wheel of the bike.

BACKGROUND OF THE INVENTION

John K. Starley in 1885 produced a bicycle named "rover" that featured a steerable front wheel and a chain drive to a rear wheel. The chain drive improved comfort and speed and allowed for a smooth, relaxed and injury free foot pedaling of the bicycle. In the late 1960 Americans, recognizing the value of exercise and energy efficient transportation predicated a bike boom for ten-speed bicycles. Conventional bicycles have seats that irritate human body posteriors and are limited to outdoor use. In northern climates bicycles are not used due to snow and ice road conditions. Indoor exercise machines, including stationary bikes, are non-moving machines that lack outside visual stimuli during use which may cause boredom for the user. Numerous bicycle improvements and modifications have been made to improve bicycle performance, exercise, and safety. One of these bicycles is known as a stepper bike. The stepper bike allows users to use their upper body and lower body to power the vehicle while riding. The stepper bike has no seat on it's frame. Movable foot pedals are depressed by the user's feet to propel the bike. The user positions him or herself by holding onto handlebars and standing on the foot pedals. Then the user shifts his or her weight alternately from foot to foot, and thereby moves the foot pedals up and down in a walking motion to transport torque to the bikes drive wheel. Examples of stepper bikes are shown and described in the following U.S. patents.

M. T. Ludwigson and H. E. Ludwigson in U.S. Pat. No. 2,707,112 discloses a pedal operated scooter having a frame supported on a surface with a front steering wheel and rim drive wheels. A pair of foot pedals operate a crank mechanism to turn a shaft, a unidirectional driving mechanism, and an endless belt transmits power from the shaft to a rear wheel drive shaft connected to the rear wheels.

N. J. Rills in U.S. Pat. No. 4,411,442 discloses a foot operated vehicle having a platform connected to support members accommodating front and rear wheels. Independently depressable front and rear pedals are operable to transmit power to the front and rear wheels. Springs associated with each pedal bias the pedals toward upper positions.

P. A. Berman et al in U.S. Pat. No. 5,368,321 discloses a four wheel vehicle propelled by vertical foot movement of a human rider. A pair of footboards located on opposite sites of a shroud connected to pivot members are coupled to a drive mechanism for the rear wheels. The rider alternatively presses the footboards downward to apply driving torque to the drive mechanism to turn the rear wheels.

S. B. M. Bhoopathy in U.S. Pat. No. 6,716,141 discloses a foot pedal scooter having a frame connected to a front steering wheel and a rear drive wheel. A pair of foot pedals pivotally mounted on the frame angularly move arms connected to chains trained over sprockets. Free wheel elements drivably connected to the sprockets transmit power to the drive wheels. Springs connected to the chains bias the foot pedals to up positions.

SUMMARY OF THE INVENTION

The invention comprises a stepper bike having a body with an internal chamber supported on a surface with four wheels. The bike has a low center of gravity that increases riding and turning stability. The wheels mounted on opposite sides of the body further increases the bikes stability and allows physically disabled and persons with decreased mobility to obtain exercise. Foot pedal units pivotally mounted on opposite sides of the body are moved up and down by the bike operator to transmit power to a drive mechanism located in the interior chamber of the body. The drive mechanism transmits rotational force to a drive wheel to propel the bike along a surface. An upright steering column mounted on the body is coupled to a steering mechanism having linkage members operably connected to the front wheels whereby rotation of the steering column turns the front wheels to steer the bike. The stepper bike includes a brake operable to retard rotation of the drive wheel. The brake actuator includes members in the steering column that are responsive to movement of handles pivotally connected to the steering column to apply the brake. The pivoting brake handles allow for greater braking force due to limited grip-strength of some users of the stepper bike. In use, the pivoting brake handles can be quickly actuated as the user's hands do not have to be re-positioned or grab or squeeze a brake lever. The drive mechanism, steering mechanism, brake and brake actuator located within the internal chamber of the body provides safety and the ability to use the stepper bike indoors. Supports or bumpers mounted on an end of the body allow the bike to stand upright for storage.

DESCRIPTION OF THE DRAWING

FIG. 19 is a sectional view taken along line 19-19 of FIG. 4;

FIG. 20 is an exploded perspective view of the handle of FIG. 19; and

DETAILED DESCRIPTION OF THE INVENTION

Figure 1:
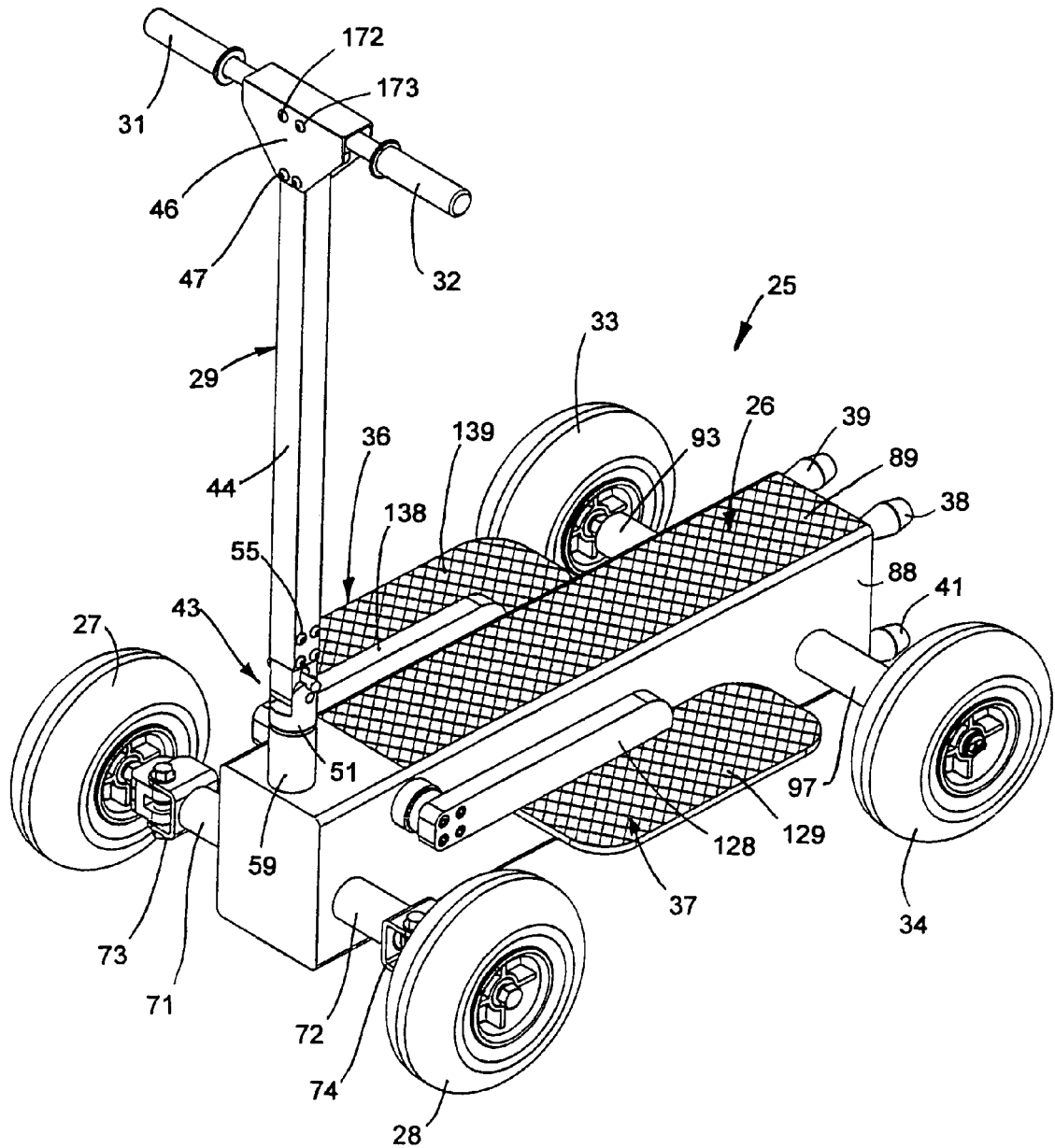
FIG. 1 is a front perspective view of the stepper bike of the invention.
Figure 2:
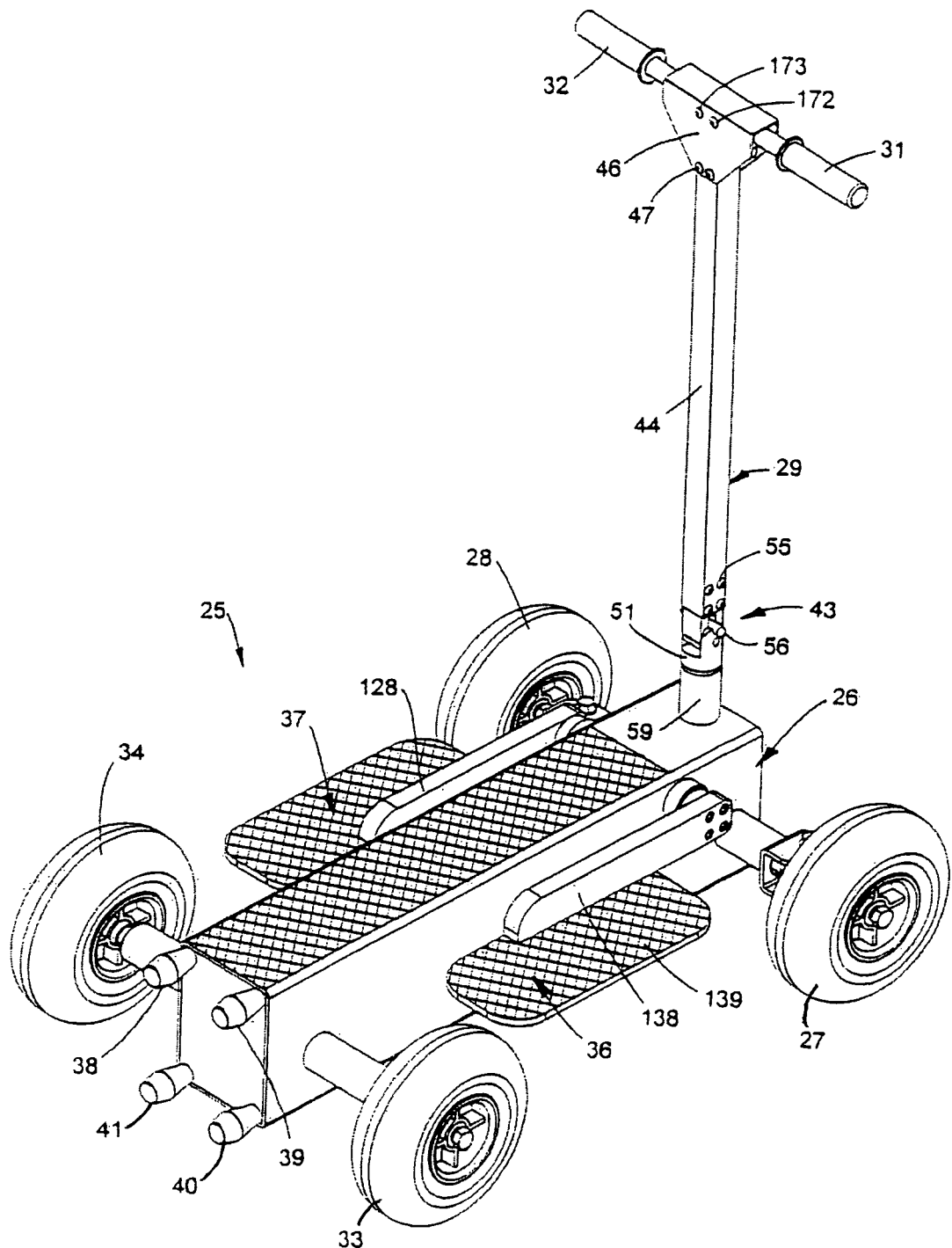
FIG. 2 is a rear perspective view of the stepper bike.

Land vehicle 25, known as a stepper bike, shown in FIGS. 1 and 2 has an elongated tubular body 26 supported on a surface with front wheels 27 and 28 and rear wheels 33 and 34. Wheels 27, 28, 33, and 34 have non-marking rubber tires with foot prints that allow indoor and elevator use of the vehicle. An upright steering column 29 mounted on the front of body 26 is operatively connected to wheels 27 and 28 to allow a vehicle operator to steer or turn vehicle 25 as it moves along the surface. A pair of handles 31 and 32 joined to the upper end of steering column 29 are used to turn the steering column 29 and apply the vehicles brake as hereinafter described. Rear wheels 33 and 34 are connected to opposite side walls of body 26 with tubular housings 93 and 97. Foot pedal units 36 and 37 located adjacent opposite sides of body 26 are used by the vehicle operator to propel vehicle 25 along a surface, such as a street, walk, or floor.

Figure 3:
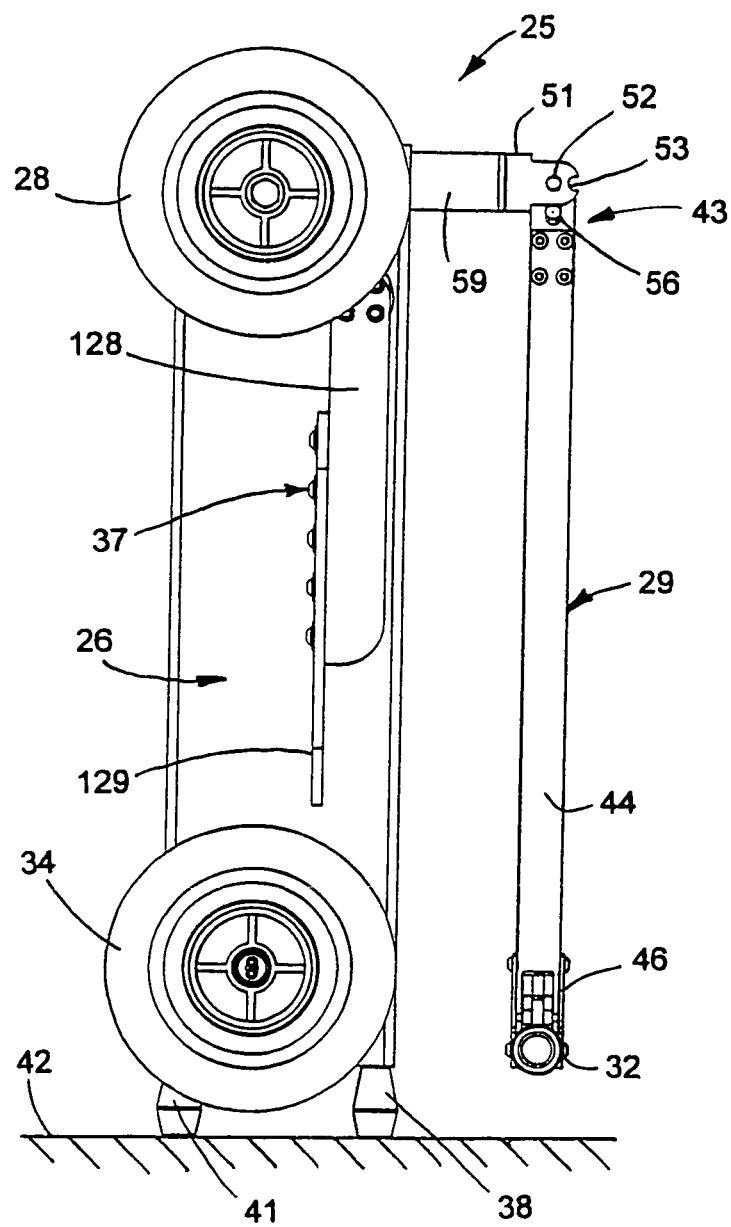
FIG. 3 is a side elevational view of the stepper bike in an upright storage position.
Figure 4:
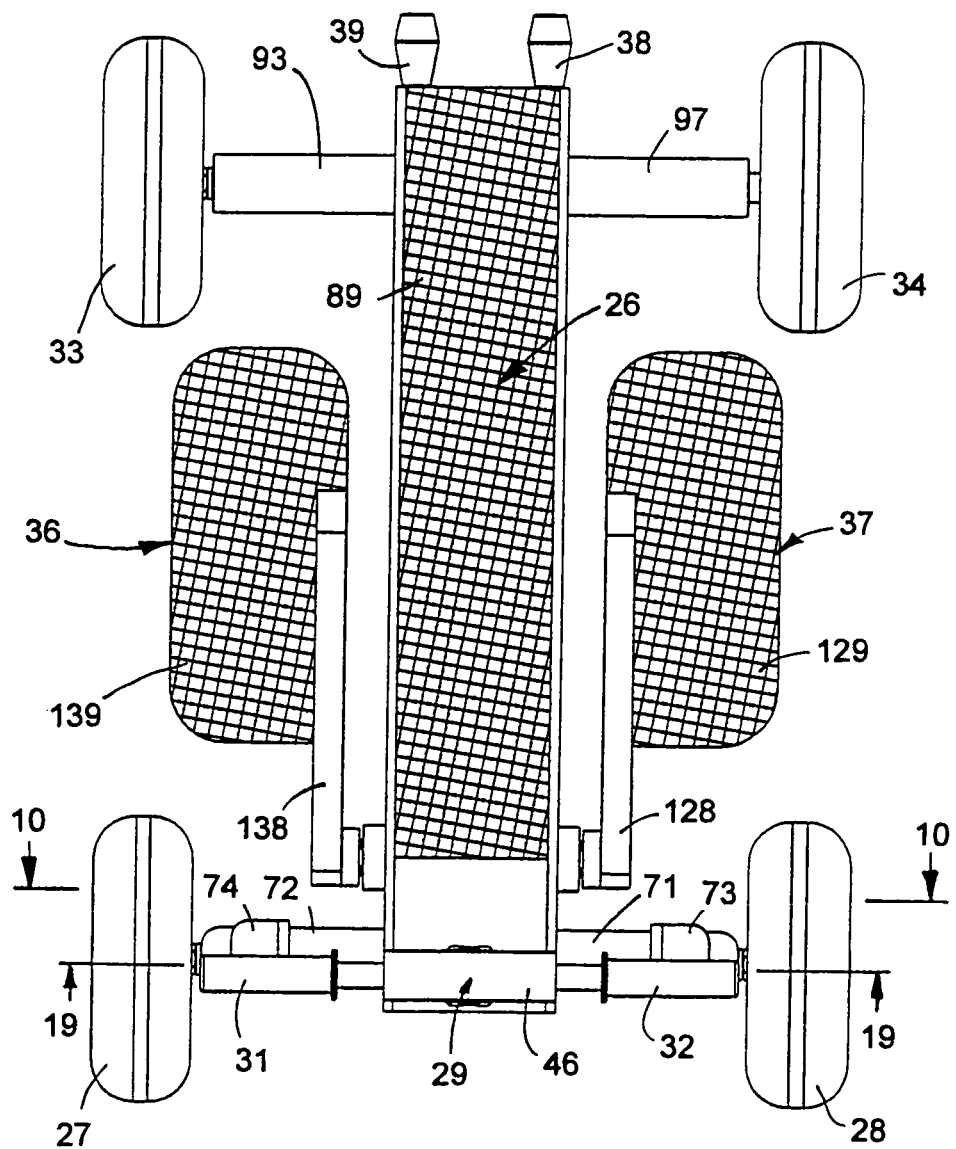
FIG. 4 is an enlarged top plan view of the stepper bike.

As shown in FIGS. 2 and 3, a plurality of knobs or bumpers 38, 39, 40, and 41 attached to the rear end of body 26 function to support the vehicle 25 in an upright storage or standing position on a surface 42. Steering column 29 is folded down adjacent and generally parallel to body 26. A latch and hinge assembly 43 connected to steering column 29 and an upright tubular housing 59 secured to body 26 allows steering column 29 to swing between the upright position shown in FIGS. 1 and 2 and the folded position shown in FIG. 3. Bumpers 38-41 are cylindrical compressible members, such as rubber or plastic knobs. The bumpers can be connected to the front end of body 26 or to both the front and rear ends of body 26.

The vehicle steering assembly shown in FIGS. 1, 2, 19 and 20 comprises an elongated linear steering tube 44 having an upper end connected to a U-shaped member 46 with a plurality of fasteners 47, shown as bolts. Handles 31 and 32 extended into U-shaped member 46 are pivotally connected to U-shaped member 46 with pivot bolts 172 and 173. Handles 31 and 32 provide hand grips for a person to rotate steering tube 44 as shown by arrow 48 in FIG. 10. The lower end of tube 44 is attached to a connecting member 49 having a transverse hole for a pivot pin 52.

Figure 11:
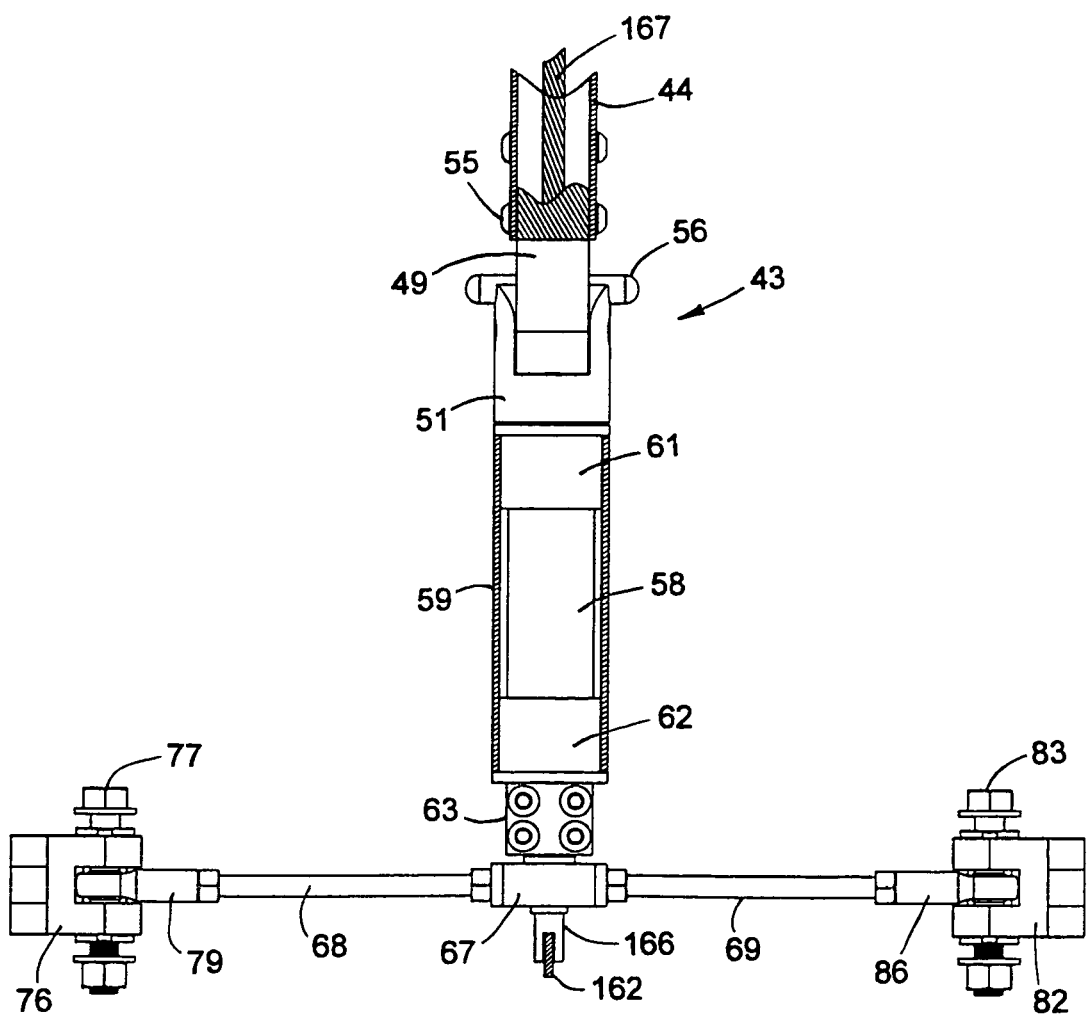
FIG. 11 is an enlarged front elevational view, partly sectioned, of the steering linkage assembly for the front wheels of the stepper bike.
Figure 12:
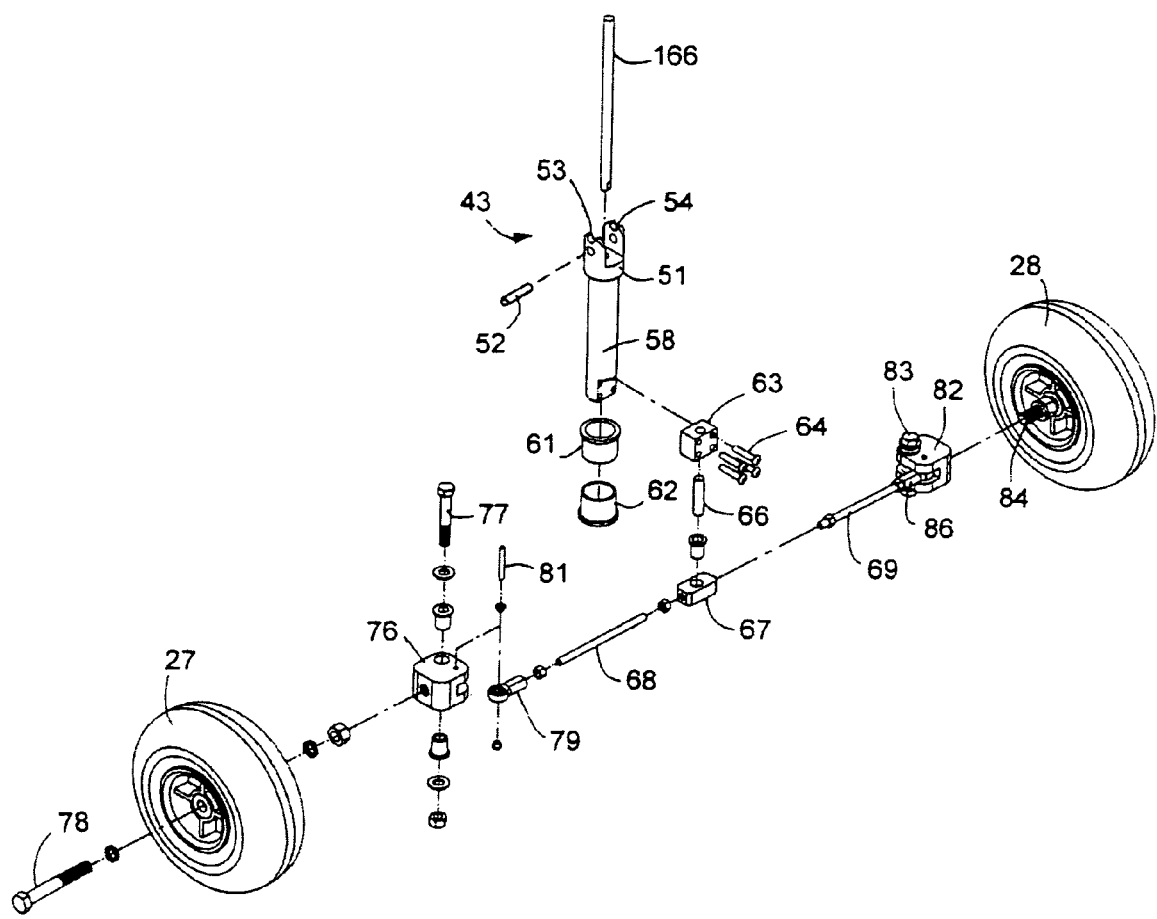
FIG. 12 is an exploded perspective view of the steering linkage assembly shown in FIG. 11.

Latch and hinge assembly 43, shown in FIGS. 11 and 12, has a U-shaped member or yoke 51 accommodating connecting member 49 secured to the lower end of steering column tube 44 with fasteners 55, such as bolts. A transverse pivot pin 52 pivotally connects member 49 to yoke 51 to allow steering column 29 to pivot about a generally horizontal axis from its first position to the second position shown in FIGS. 1 and 3. Opposite upper ends of yoke 51 have recesses or notches 53 and 54 that accommodate a pin or rod 56. Rod 56 extends through an upright slot 57 in member 49. Rod 56 is biased into notches 53 and 54 with compression spring 60 to retain steering column 29 in the upright steering position. Steering column 29 can also be folded forward to allow land vehicle 25 to be pulled along the support surface.

Figure 5:
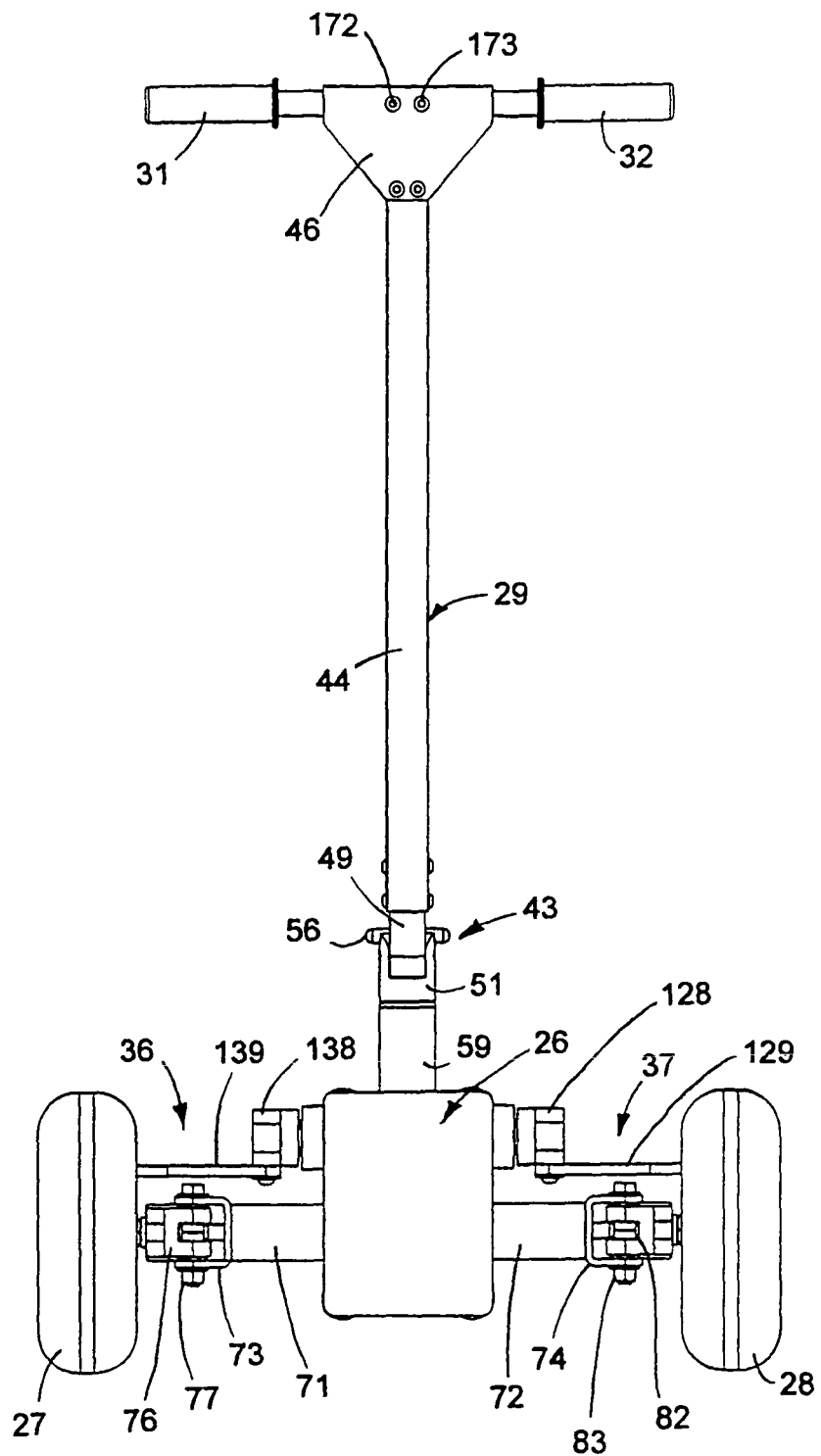
FIG. 5 is an enlarged front elevational view of the stepper bike.
Figure 6:
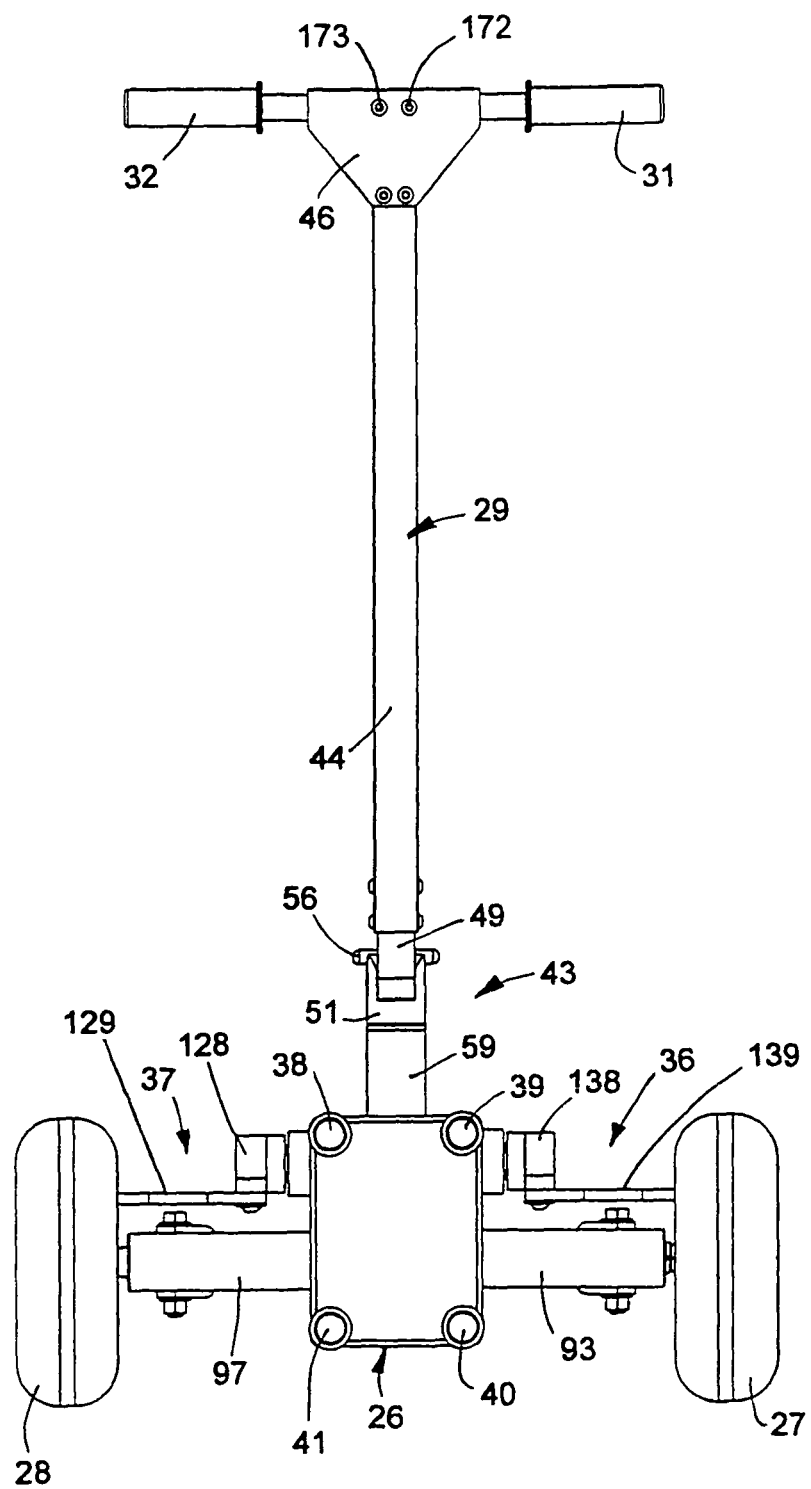
FIG. 6 is an enlarged rear elevational view of the stepper bike.
Figure 10:
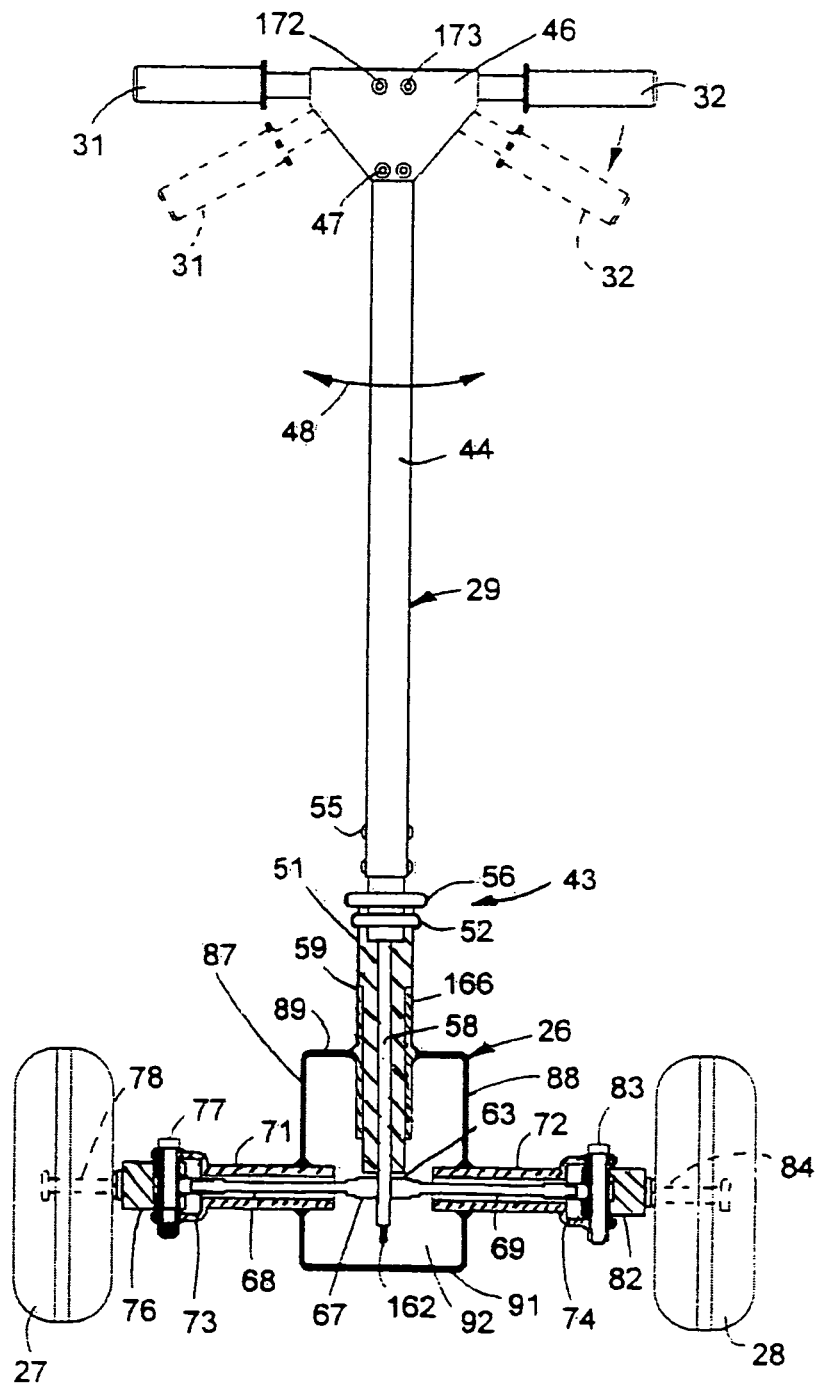
FIG. 10 is an enlarged front elevational view, partly sectioned, of the stepper bike.

As shown in FIGS. 10, 11, and 12, a downwardly extended tubular shaft 58 secured to yoke 51 is rotatably supported with sleeve bearings 61 and 62 on an upright tubular housing 59 secured to body 26. A block 63 attached with fasteners 64 to shaft 58 accommodates a sleeve pin 66 extended into a member 67. Linear tie rods 68 and 69 are threaded into opposite ends of member 67. As shown in FIGS. 5 and 10, the rods 68 and 69 extend through tubular housings 71 and 72 secured to opposite side walls 87 and 88 of body 26. U-shaped yokes 73 and 74 are attached to outer ends of housings 71 and 72. A block 76 located within yoke 73 is pivotally connected to yoke 73 with an upright king pin 77. An axle 78 rotatably supporting wheel 28 is threaded into block 76 to support wheel 28 on block 76. Tie rod 68 is coupled to block 67 with a connector 79 and pivot pin 81. A block 82 located within yoke 74 is pivotally connected to yoke 74 with an upright king pin 83. An axle 84 rotatably supporting wheel 27 is connected to block 82. The outer end of tie rod 69 is attached to block with connector 86.

In use the vehicle operator grip handles 31 and 32 and rotates steering column 29 as shown by arrow 48 in FIG. 10. Steering column 29 connected to shaft 58 turns shaft 58 which subjects tie rods 68 and 69 a lateral force causing blocks 76 and 82 to angularly move relative to king pins 77 and 83. The wheels 27 and 28 are concurrently angularly turned about the upright axis of king pins 77 and 83 to thereby steer vehicle 25 in a right or left direction. Steering column 29 when turned to it's original position with handles 31 and 32 transverse to body 26 return wheels 27 and 28 to generally parallel positions whereby vehicle 25 can be moved in a straight forward direction.

The vehicle drive apparatus is manually operated with the movement of the vehicle operator's feet. As shown in FIGS. 13 to 18, body 26 has opposite side walls 87 and 88 joined to top and bottom walls 89 and 91. Walls 87, 88, and 91 surround an elongated horizontal internal chamber 92 accommodating the power transmission components of the drive apparatus, the steering mechanism, and vehicle brake. This protects the vehicle operator and enhances the appearance of the stepper bike. Body 26 can be a two piece structure to facilitate access to the drive mechanism, steering mechanism and brake located within internal chamber 92. The two piece structure will also facilitate the users ability to use the stepper bike indoors.

Figure 13:
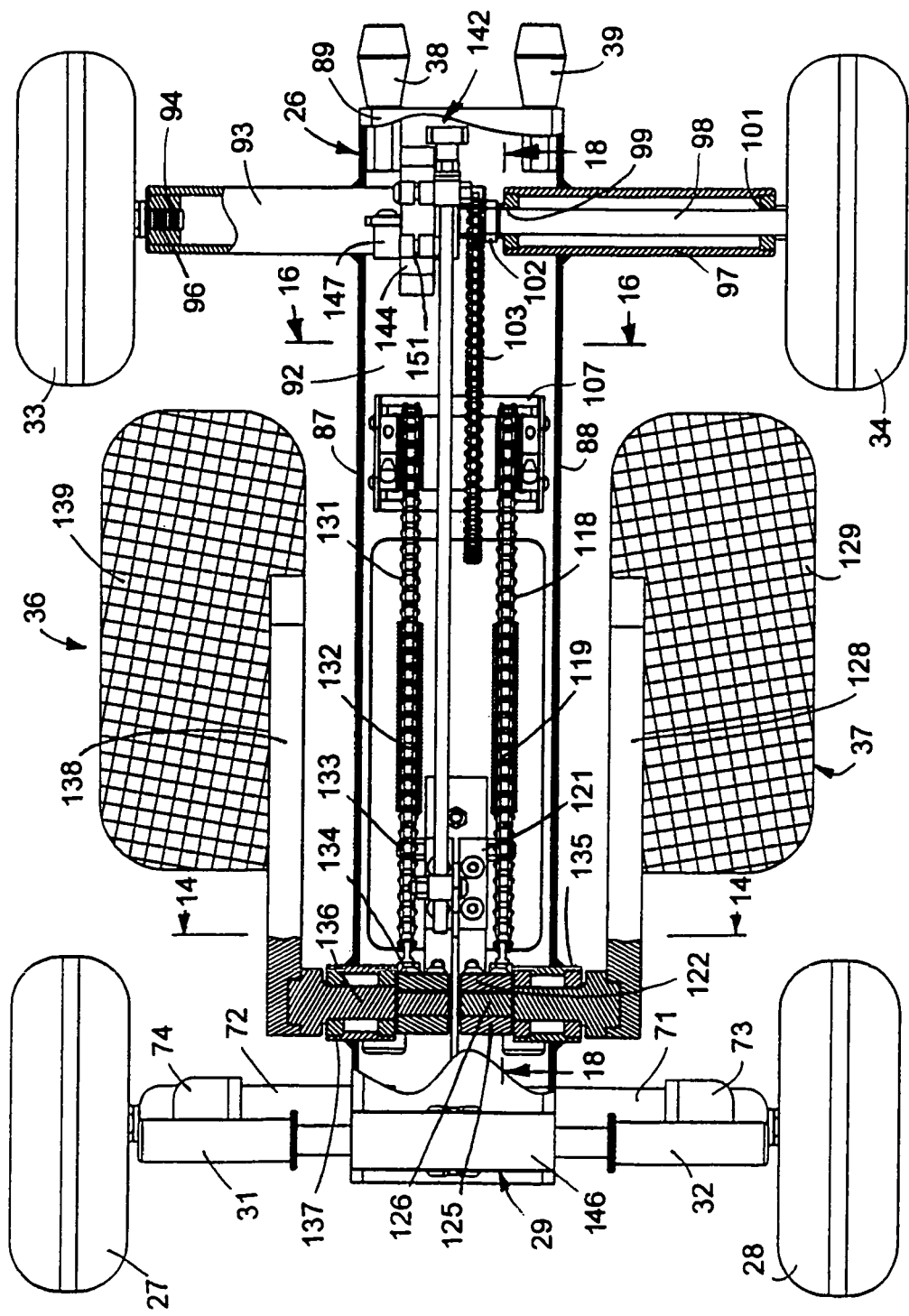
FIG. 13 is an enlarged top plan view, partly sectioned, of the stepper bike.

As shown in FIG. 13, tubular housing 93 and 97 secured to side walls 87 and 88 of body 26 support wheels 33 and 34. Housing 93 has an outer end surrounding and supporting a plug 94 have a threaded bore. Axle 96 of wheel 33 is threaded in the bore to connect axle 96 to plug 94. A drive shaft 98 extended through tubular housing 97 has an outer end drivably connected wheel 34. Bearings 99 and 101 rotatably support shaft 98 on tubular housing 97.

Figure 7:
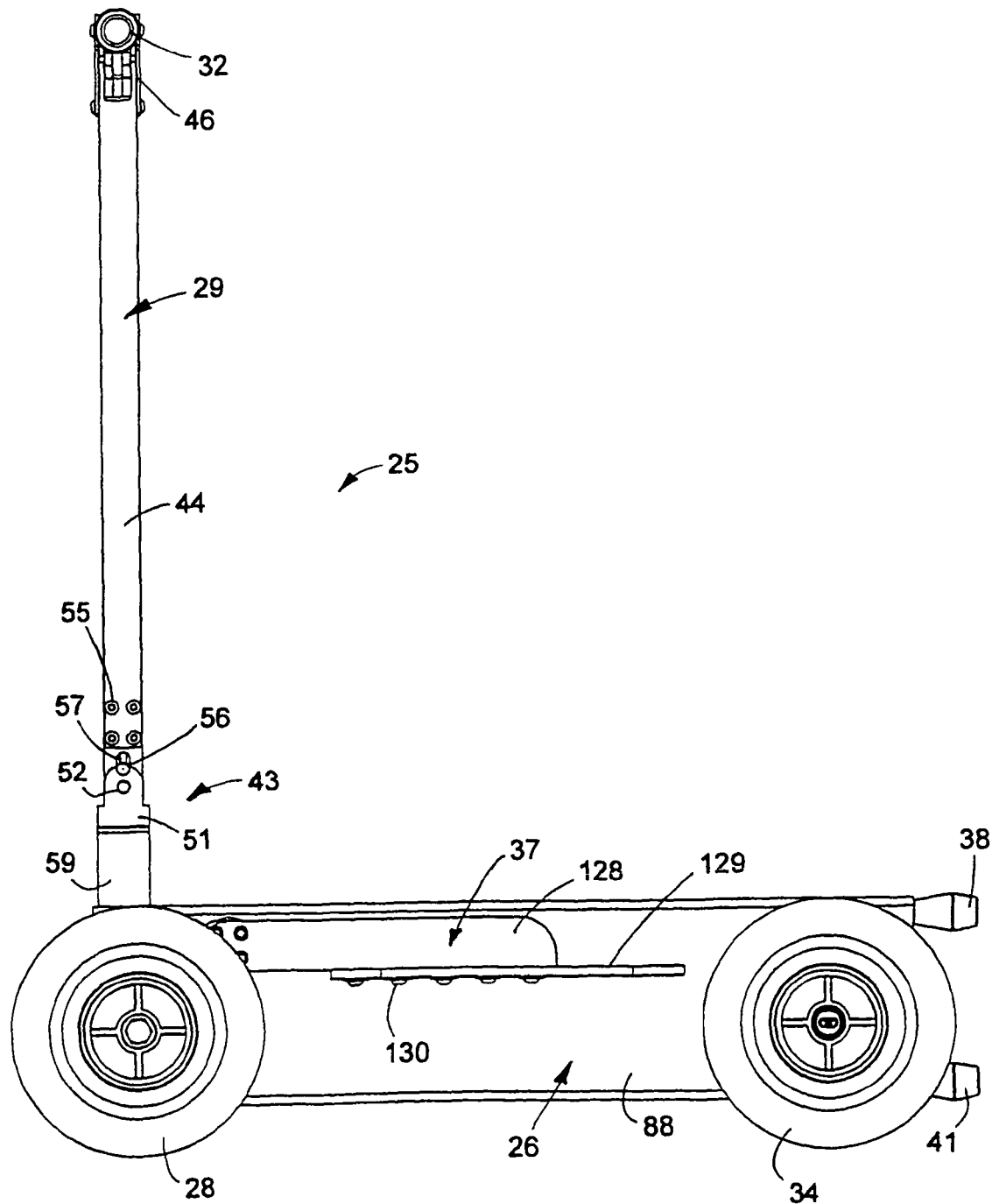
FIG. 7 is an enlarged side elevational view of the left side of the stepper bike.
Figure 9:
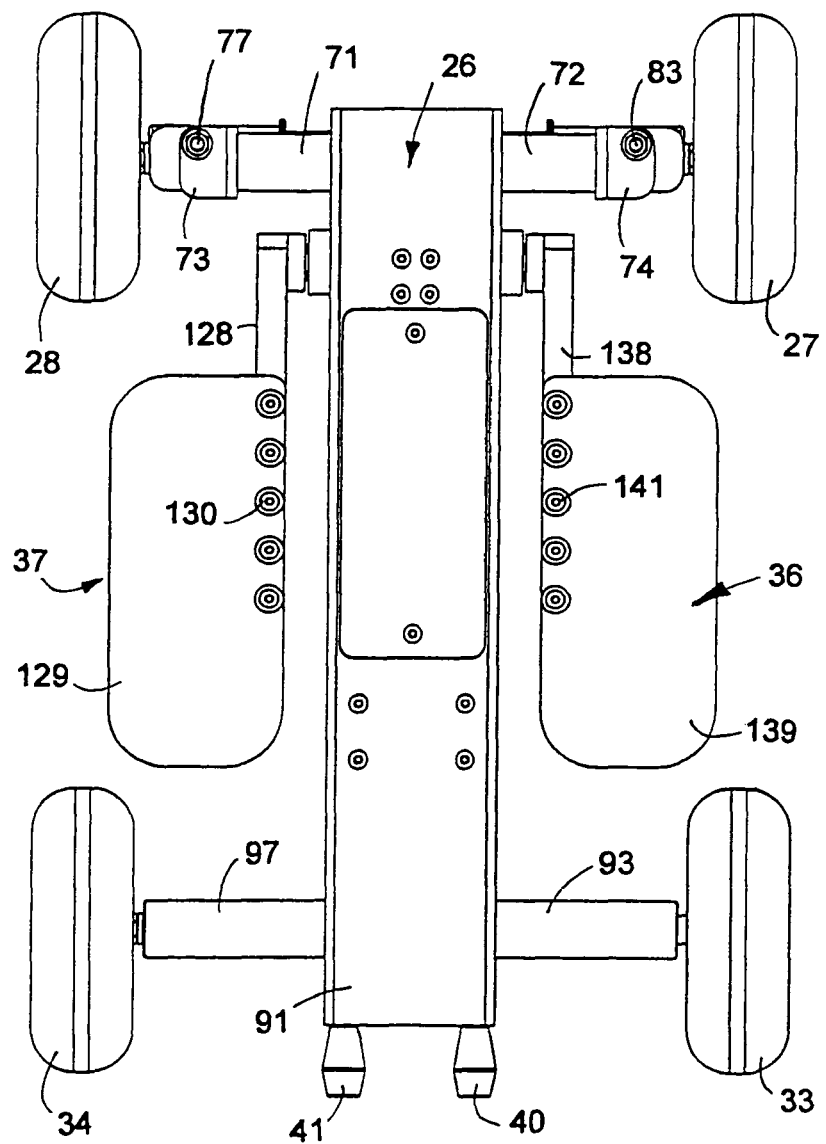
FIG. 9 is an enlarged bottom plan view of the stepper bike.
Figure 14:
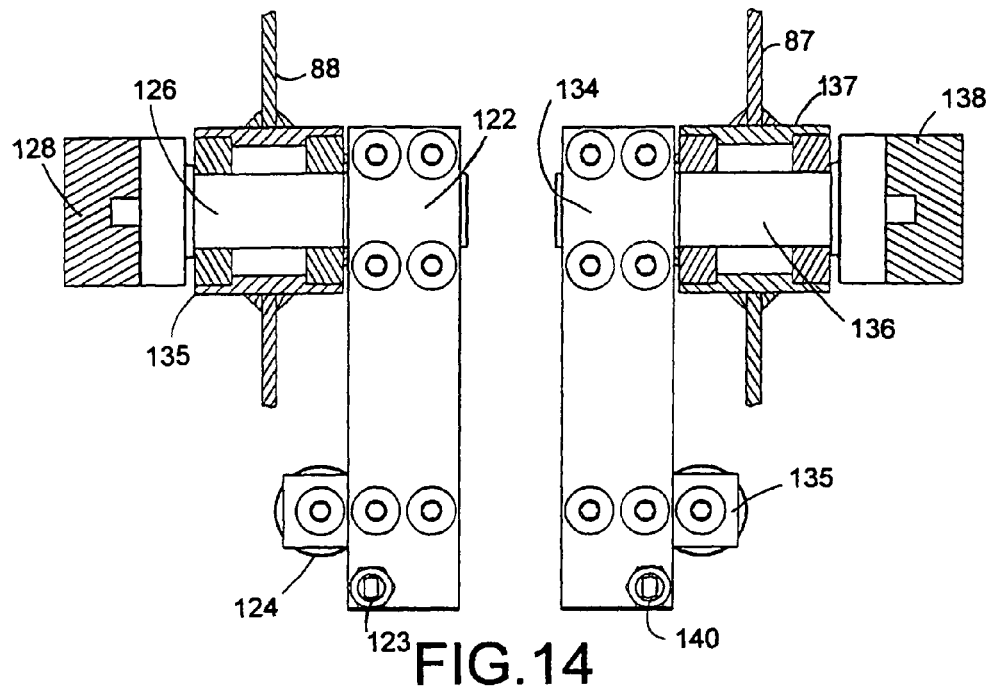
FIG. 14 is an enlarged sectional view taken along line 14-14 of FIG. 13.
Figure 15:
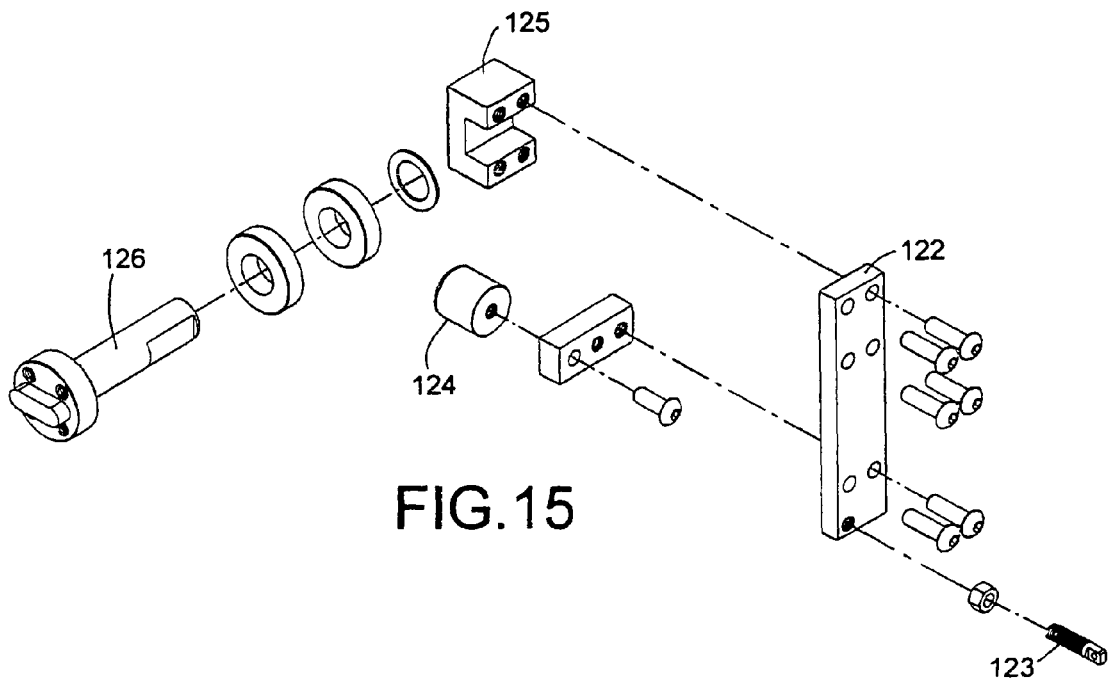
FIG. 15 is an exploded perspective view of a pedal linkage of FIG. 14.
Figure 16:
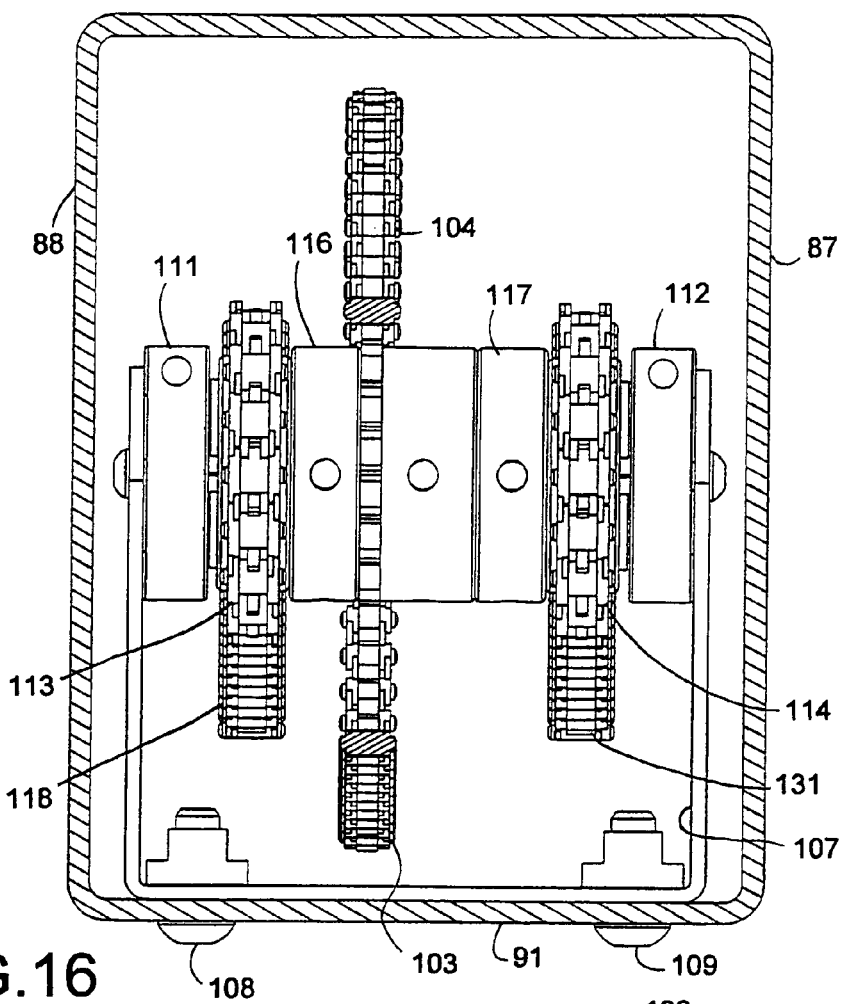
FIG. 16 is an enlarged sectional view taken along line 16-16 of FIG. 13.
Figure 17:
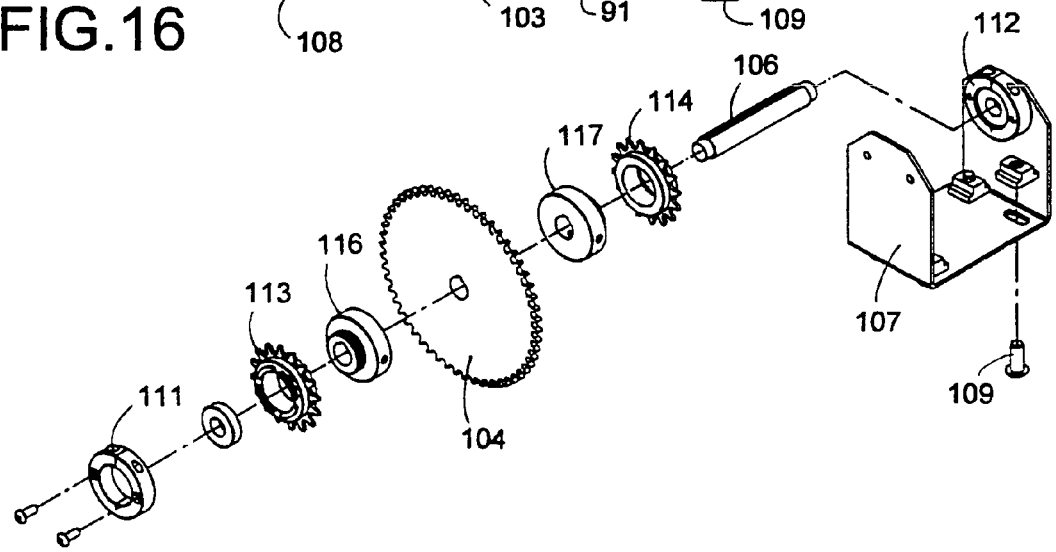
FIG. 17 is an exploded perspective view of FIG. 16.
Figure 18:
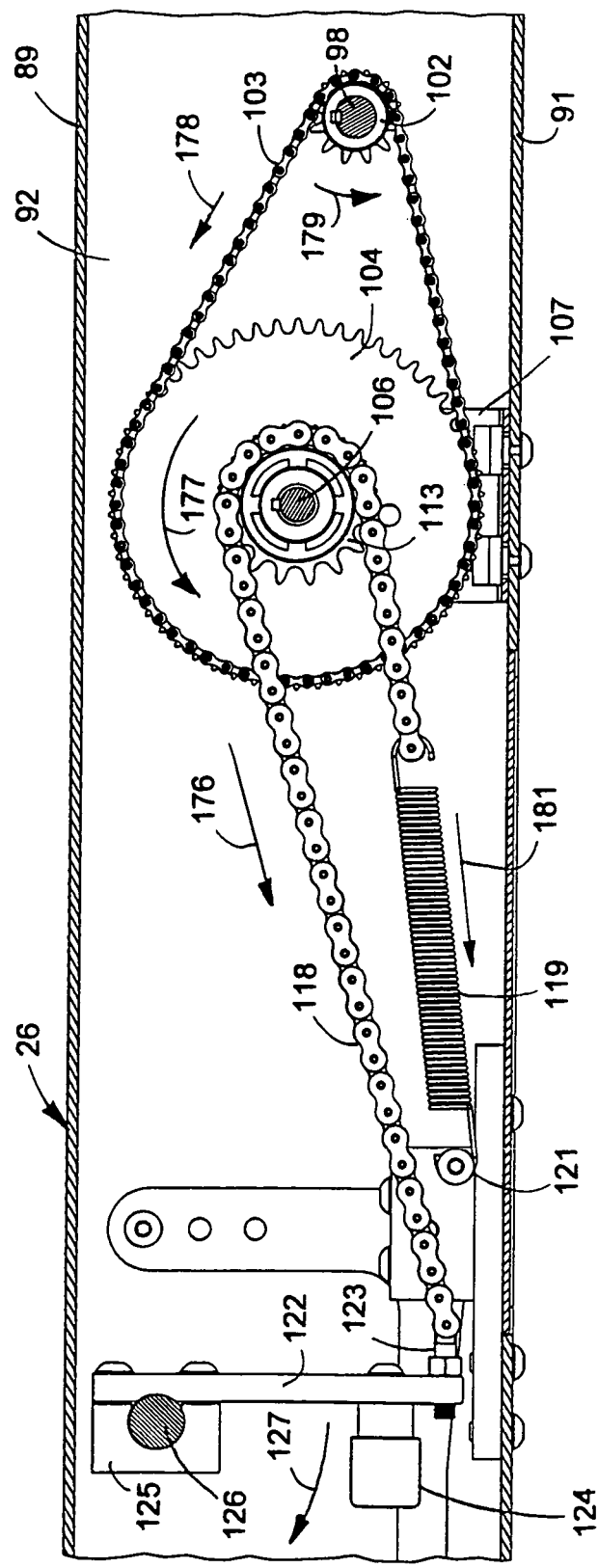
FIG. 18 is an enlarged sectional view taken along the line 18-18 of FIG. 13.

As shown in FIG. 18, a sprocket 102 drivably mounted on shaft 98 engages an endless chain 103 trained about a sprocket 104. A transverse shaft 106 rotatably mounted on a U-shaped support 107 with bearing holders 111 and 112 accommodating toroidal bearings. Fasteners 108 and 109 secure support 107 to bottom wall 91 of body 26. A pair of ratcheted sprockets 113 and 114 are drivably associated with hubs 116 and 117 attached to shaft 106 as shown in FIG. 17. Sprockets 113 and 114 attached to shaft 106 as shown in FIG. 17. Sprocket 113 is a left-handed ratcheted sprocket. Sprocket 114 is a right-handed ratcheted sprocket. Sprockets 113 and 114 include overrunning clutches that automatically engage in one direction and freewheel in the opposite direction of rotation. An example of unidirectional driving mechanism is disclosed in U.S. Pat. No. 2,707,112 incorporated herein by reference. A first link chain 118 trained around sprocket 113 is connected to a coil spring 119. Spring 119 is connected to an anchor 121 secured to support 157 attached to the bottom wall 91 of body 26. The opposite end of chain 118 is attached to a connector 123 secured to the bottom of a lever member 122. Connector 123 is located adjacent a compressible rubber bumper 124 secured to the lower end of lever member 122. Bumper 124 engages the inner end of sleeve member 72 to limit swinging movement of lever member 122 thereby limiting the angular down movement of pedal unit 37. The upper end of lever member 122 is fixed with U-shaped block 125 to a shaft 126 for angular movement shown by arrow 127. As shown in FIGS. 13 and 14 shaft 126 is rotatably mounted within a tubular housing 135 secured to side wall 88 of body 26. The outer end of shaft 126 is fastened to a longitudinal arm 128 located spaced from a generally parallel to side wall 88. A left flat foot plate 129 is attached to the bottom of arm 128 with a plurality of fasteners 130, as shown in FIGS. 7 and 9.

Figure 8:
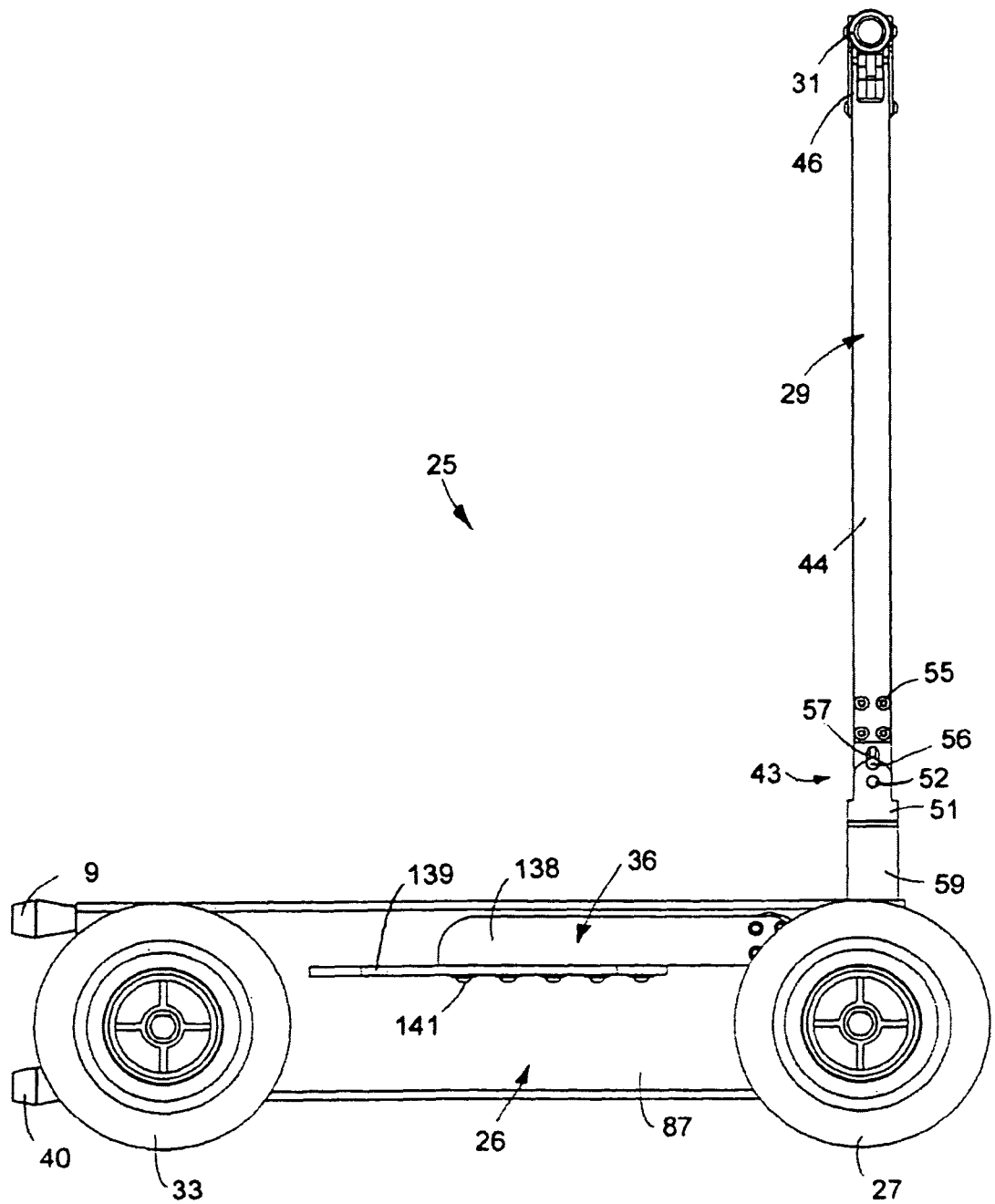
FIG. 8 is an enlarged side elevational view of the right side of the stepper bike.

A second link chain 131 trained around sprocket 114 is connected to a coil spring 132. An anchor 133 secures one end of spring 132 to the bottom wall 91 of body 26. The opposite end of chain 131 is attached to a connector 140 secured to the lower end of a lever member 134. As shown in FIGS. 13 and 14, lever member 134 is connected to a shaft 136 rotatably mounted within a tubular housing 137. Housing 137 extends through and is secured to side wall 87 of body 26. Shaft 136 is axially aligned with shaft 126. A compressible bumper 135 is attached to lever member 134 adjacent connector 140. Bumper 135 engages the inner end of sleeve member 71 to limit swinging movement of lever member 134 thereby limiting the angular down movement of pedal unit 36. A longitudinal arm 138 attached to the outer end of shaft is located spaced from and generally parallel to side wall 87 of body 26. A flat right foot plate 139 is connected to the bottom of arm 138 with a plurality of fasteners 141, shown in FIGS. 8 and 9.

Top wall 89 of body 26 and top surfaces of foot plates 129 and 139 has cartesian coordinated grooves to provide non-skid surfaces to ensure firm contact of the user's feet on these surfaces. Anti-skid mats and coatings can be mounted on top wall 89 of body 26 and top surfaces of foot plates 129 and 139.

A person using vehicle 25 places his/her feet on foot pedal units 36 and 37 and alternatively applies a downwardly directed force on the pedal units 36 and 37. When pedal unit 37 is moved down shaft 126 is rotated in a clockwise direction causing lever member 122 to swing as shown by arrow 127 in FIG. 18. Lever member 122 pulls chain 118 in the direction of arrow 176 causing sprockets 113 and 104 to turn in the direction of arrow 177. Sprocket 104 applies force in chain 103 shown by arrow 178 which in turn rotates shaft 98 and wheel 34 thereby moving vehicle 25 along it's support surface. When the force on foot pedal unit 37 is released by raising a persons foot spring 119 pulls chain 118, shown by arrow 181 in FIG. 18, to bias foot pedal 37 in an up position as shown in FIGS. 1 to 9. Right foot pedal unit 36 functions in the same manner as left foot pedal 37. When foot pedal is forced downward, force is transmitted to shaft 98 through chains 131 and 103. Both pedal units 36 and 37 can be simultaneously forced down when the user jumps on the foot plates 129 and 139. This action will jump start vehicle 25. Start-up force or torque can be achieved by applying foot force on rear sections of foot plates 129 and 139. Applying foot force on the front sections of foot plate 129 and 139 reduces pedal unit strokes and driving power to wheel 34.

Figure 21:
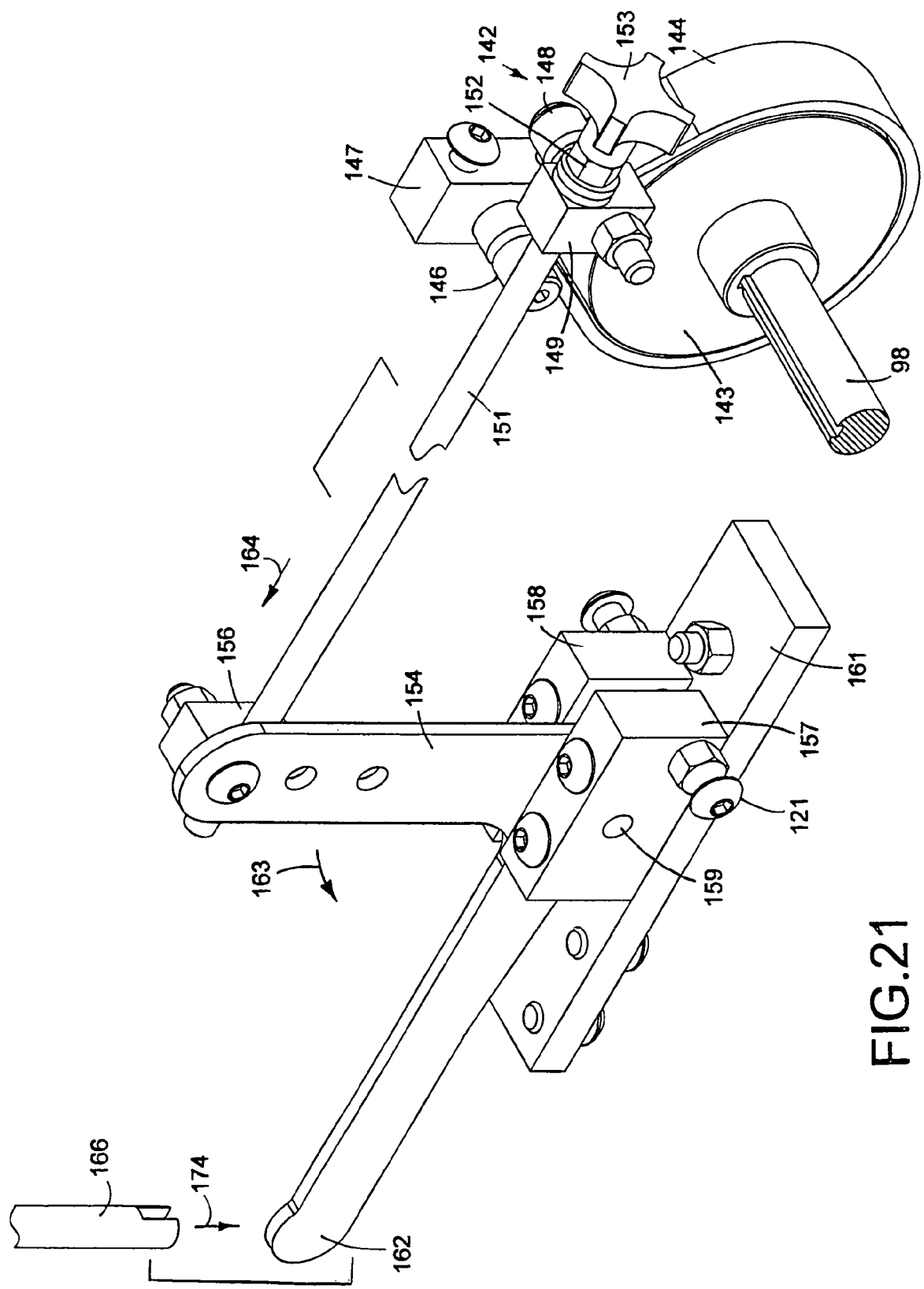
FIG. 21 is an enlarged foreshortened exploded view of the band brake and brake actuator assembly of the stepper bike.

Vehicle 25 includes an internal brake 142 mounted on shaft 98 adjacent sprocket 102. As shown in FIG. 21, brake 142 has a cylindrical drum 143 mounted on shaft 98. A brake band 144 encircles outer cylindrical surface of drum 143. One end of band 144 is attached to an anchor 146 mounted on a fixed support 147. The opposite end of band 144 is mounted on a bolt 148 connected to a block 149. A brake actuator rod 151 extends through a hole in block 149. A nut 152 threaded on rod 151 secures rod 151 to block 149. A knob 153 threaded on the end of rod 151 engages nut 152 to lock nut 152 on rod 151. The front end of rod 151 is pivotally connected to an L-shaped lever 154 with a connector 156. Lever 154 has an apex located between support members 157 and 158 fastened to a base plate 161 attached to the bottom wall 91 of body 26. A transverse pivot pin 159 pivotally connects lever 154 to support members 157 and 158 for pivotal movement shown by arrow 163. When lever 154 is pivoted in the direction of arrow 163 rod 151 is moved in the direction of arrow 164 to apply to activate brake 142 to retard rotation of wheel 34.

The steering column actuator for brake 142, shown in FIGS. 11, 19, and 20, engages the forward end 162 of lever 154 and applies downward force to lever 154 to actuate brake 142. A first upright rod 166 extended through shaft 58 has a bifurcated lower end accommodating end 162 of lever 154. The upper end of rod 166 contacts a second upright rod 167 extended through steering column tube 44 and secured to a cross member 168. The opposite ends of cross member 168 rotatably support rollers 169 and 171. Handles 31 and 32 pivotally attached to U-shaped member 46 with pivot pins 172 and 173 have adjacent portions that contact rollers 169 and 171. When handles 31 and 32 force cross member 168 in a downward direction whereby rod 167 pushes rod 166 to apply a downward force, shown by arrow 174, on the end 162 of lever 154. This action results in movement of brake band 144 into braking engagement with drum 143. The brake 142 is confined to the interior chamber 92 of body 26 which protects the brake structure from adverse environment elements, such as water, ice, snow, dust and dirt. The push rods 166 and 167 reduce brake failures as they are rigid members having miniscule sliding friction. Conventional thin wire cables have substantial sliding friction between the cable wire and sheath due to cable routing and bending. The sliding friction of the cable wire increases the manual force required for applying the brakes of a bicycle.

It is understood that various modifications of structures, materials, and arrangement of structures can be made to the above-described preferred embodiment of the stepper bike, without departing from the scope of the invention as defined in the appended claims.

What is claimed is:

1. A stepper bike comprising:
a body having opposite side walls, a top wall, a bottom wall, and an end wall surrounding an interior chamber,
a pair of front wheels located adjacent said side walls of the body,
first housings secured to the side walls of the body,
members mounted on the first housings for rotatably supporting the front wheels,
a steering column mounted on the top wall of the body for rotation about a generally upright axis,
handles attached to the steering column useable by an operator to rotate the steering column,
linkage members connecting the steering column to the members mounted on the first housings operable to turn the front wheels in response to rotation of the steering column,
a pair of rear wheels located adjacent said side walls of the body,
second housings secured to the side walls of the body,
a drive shaft rotatably supported on one of said second housings, said drive shaft being connected to one of said rear wheels,
a drive mechanism located in the interior chamber of the body, said drive mechanism being operably connected to the drive shaft to transmit power to the drive shaft to rotate said one rear wheel, and foot pedal units movably mounted on the opposite side walls of the body, said foot pedal units being operatively connected to the drive mechanism, said foot pedal units configured to be moved with the operator's feet to transmit force to the drive mechanism whereby the drive mechanism rotates the drive shaft and the one rear wheel to move the stepper bike relative to a surface supporting the stepper bike.

2. The stepper bike of claim 1 including:

at least one support mounted on the end wall of the body for supporting the body in an upright position on the surface.

3. The stepper bike of claim 1 including:

a plurality of supports mounted on the end wall of the body for supporting the body in an upright position on the surface.

4. The stepper bike of claim 1 wherein:

the foot pedal units comprise a right foot pedal member located adjacent one of the side walls of the body, a first shaft connecting the right foot pedal member to the drive mechanism to transmit force to the drive mechanism, a left foot pedal member located adjacent the side wall opposite the one of the side walls of the body, and a second shaft connecting the left foot pedal member to the drive mechanism to transmit force to the drive mechanism.

5. The stepper bike of claim 1 including:

a brake for retarding rotation of said one rear wheel, a brake actuator located in the interior chamber of the body and steering column, and a member including pivot connectors attaching the handles to the steering column, said handles engagable with the brake actuator to move the brake actuator to apply the brake in response to pivotal movements of the handles by the operator of the stepper bike.

6. The stepper bike of claim 1 including:

a hinge assembly mounted on the body connected to the steering column operable to selectively hold the steering column in a first upright position and a folded position adjacent the body.

7. The stepper bike of claim 6 wherein:

the hinge assembly includes a releasable latch for retaining the steering column in the first upright position.

8. A stepper bike comprising:

a body having an end wall, a pair of front wheels operatively mounted on the body, a pair of rear wheels operably mounted on the body, said front and rear wheels being operable to support the body on a surface, a steering column operatively connected to the front wheels for steering the front wheels, a hinge assembly mounted on the body, said hinge assembly being connected to the steering column, said hinge assembly being operable to selectively hold the steering column in an upright steering position and a folded position adjacent the body, at least one bumper mounted on the end wall of the body for supporting the body in an upright position on the surface supporting the stepper bike, a drive mechanism mounted on the body, said drive mechanism being operatively connected to one of the rear wheels, foot pedal units movably mounted on the body, said foot pedal units being operatively connected to the drive mechanism, said foot pedal units configured to be moved with an operator's feet to transmit force to the drive mechanism whereby the drive mechanism rotates the one rear wheel to move the stepper bike relative to the surface supporting the stepper bike, the foot pedal units comprising a right foot pedal member located adjacent a side of the body, a first shaft connecting the right foot pedal member to the drive mechanism to transmit force to the drive mechanism, a left foot pedal member located adjacent a side of the body, and a second shaft connecting the left foot pedal member to the drive mechanism to transmit force to the drive mechanism.

9. A stepper bike comprising:

a body having an end wall, a pair of front wheels operatively mounted on the body, a pair of rear wheels operably mounted on the body, said front and rear wheels being operable to support the body on a surface, a steering column operatively connected to the front wheels for steering the front wheels, a hinge assembly mounted on the body, said hinge assembly being connected to the steering column, said hinge assembly being operable to selectively hold the steering column in an upright steering position and a folded position adjacent the body, at least one bumper mounted on the end wall of the body for supporting the body in an upright position on the surface supporting the stepper steeper bike, a brake for retarding rotation of one rear wheel, a brake actuator located in said body and steering column, and handles pivotally connected to said steering column and engagable with the brake actuator for operating the brake actuator in response to pivotal movements of the handles by an operator of the stepper bike.

10. The stepper bike of claim 9 wherein:

the hinge assembly includes a releasable latch for retaining the steering column in the folded position adjacent the body.

11. The stepper bike of claim 9 including:

a plurality of bumpers mounted on the end of the body for supporting the body in the upright position on the surface.

12. The stepper bike of claim 9 including claim 9 wherein:

said handles are connected to the steering column for manually turning the steering column.

13. The stepper bike of claim 9 including:

link members connecting the steering column to the front wheels whereby rotation of the steering column angularly moves the front wheels to steer the stepper bike.

14. A stepper bike comprising:

a body having an interior chamber, first and second side walls and an end wall, a pair of front wheels operatively mounted on the body, a pair of rear wheels operatively mounted on the body, said front and rear wheels being operable to support the body on a surface, a drive mechanism mounted on the body and located within the interior chamber of the body operatively connected to one of the rear wheels, and foot pedal units movably mounted on opposite sides of the body for movement between up and down positions, said foot pedal units being operatively connected to the drive mechanism to transmit force to the drive mechanism whereby when said foot pedal units are moved from up positions to down positions with an operator's feet, force is transmitted to the drive mechanism which rotates said one rear wheel to move the stepper bike along the surface supporting the stepper bike, said drive mechanism including springs for biasing the foot pedal units from the down positions to the up positions a steering column mounted on the body, linkage members connecting the steering column to the front wheels, handles mounted on the steering column for use by the operator to turn the steering column whereby the linkage members turn the front wheels to steer the stepper bike, a brake for retarding rotation of said one rear wheel, a brake actuator located in the body and steering column, and said handles being pivotally connected to the steering column and engageable with the brake actuator for operating the brake actuator in response to pivotal movements of the handles by the operator of the stepper bike.

15. The stepper bike of claim 14 wherein:

the foot pedal units comprise a right foot pedal member located adjacent the first side wall of the body, a first shaft connecting the right foot pedal member to the drive mechanism to transmit force to the drive mechanism, a left foot pedal member located adjacent the second side wall of the body, and a second shaft connecting the left foot pedal member to the drive mechanism to transmit force to the drive mechanism.

16. The stepper bike of claim 14 including:

at least one bumper mounted on the end wall of the body for supporting the body in an upright position on the surface.

17. A stepper bike comprising:

a body having an interior chamber and an end wall, at least one front wheel operatively mounted on the body, at least one rear wheel operatively mounted on the body, said at least one front and rear wheels operable to support the body on a surface, a steering column mounted on the body, at least one linkage member connecting the steering column to the at least one front wheel, handles mounted on the steering column for use by an operator to turn the steering column whereby the at least one linkage member turns the at least one front wheel to steer the stepper bike, a brake for retarding rotation of said at least one rear wheel, a brake actuator located in the body and steering column, and said handles being connected to the steering column and engageable with the brake actuator for operation by the operator of the stepper bike to actuate the brake to retard the rotation of said at least one rear wheel of the stepper bike.

18. The stepper bike of claim 17 including:

a plurality of bumpers mounted on the end wall of the body for supporting the body in an upright position on the surface.

19. The stepper bike of claim 17 including:

a hinge assembly mounted on the body, said hinge assembly being connected to the steering column, said hinge assembly being operable to selectively hold the steering column in an upright position and a folded position adjacent to said body.

20. The stepper bike of claim 17 including:

a drive mechanism mounted on the body, said drive mechanism being operatively connected to said at least one rear wheel, foot pedal units movably mounted on the body, said foot pedal units configured to be moved with the operator's feet to transmit force to the drive mechanism whereby the drive mechanism rotates the at least one rear wheel to move the stepper bike along the surface supporting the stepper bike.

\* \* \* \* \*